March 3, 1959 — S. P. ALTMAN — 2,875,618
GYROSCOPE

Filed Jan. 14, 1957 — 3 Sheets-Sheet 1

Inventor
SAMUEL P. ALTMAN
by Hill, Sherman, Meroni, Gross & Simpson
Attys.

Inventor
SAMUEL P. ALTMAN

March 3, 1959

S. P. ALTMAN 2,875,618

GYROSCOPE

Filed Jan. 14, 1957

Inventor
SAMUEL P. ALTMAN by Hill, Sherman, Meroni, Gross & Simpson
Attys.

United States Patent Office 2,875,618
Patented Mar. 3, 1959

2,875,618
GYROSCOPE

Samuel P. Altman, Chicago, Ill., assignor to Armour Research Foundation of Illinois Institute of Technology, Chicago, Ill., a corporation of Illinois Application January 14, 1957, Serial No. 633,953

1 Claim. (Cl. 74—5.6)

This invention relates to a restrained gyroscope.

Gyroscopes of various types are used for various purposes, of which chiefly are control and/or indication. Typically they include a high speed rotor, one or more gimbals surrounding and supporting the rotor, and a base support. In precision gyroscopes, the connections between these elements are established by use of precision bearings. These bearings require an exceedingly high degree of cleanliness in order to avoid adverse effects which result in signal errors. For example, one precision gyro bearing manufacturer uses 22 separate cleaning operations after the bearing assembly has been completed in order to insure the degree of cleanliness required.

Precision gyros are used with various devices. Among these are fire control devices and vehicles. Aircraft are one of the most common gyroscope users. References made herein to aircraft are for purposes of clarification and illustration and are not intended in any way to limit the specification or claim. Typically, gyros are used to indicate or control angular displacement about an input axis or to indicate or control the rate of angular movement about a given input axis. Thus gyros in the past have been typically fitted with a displacement-sensing device such as a potentiometer, electric switch, or photocell, or with an induction device such as an induction synchro. Depending upon the mechanical configuration, a given gyro thus has typically been used as an attitude-sensing gyro, or as a rate gyro.

In gyros as they are known today, if frictional moments due to bearings or bearing dirt are exerted about the input or output axes, then an error in output signal will be present. Another common difficulty found in conventional gyros is that if the rotor spin axis is not perpendicular to the input axis, a significant cross-coupling error results. Thus, if an input rotation is imparted to the gyro about the axis where the rotor spin axis should be, there will be no signal, but where the axis of the rotor is out of its proper position, rotation about said proper axis position will produce a vector quantity signal in a different axis, such vector quantity error being here denoted as cross-coupling.

In a conventional rate gyro, the rotor-gimbal assembly is constrained to a neutral position by a spring. Consequently, the rocking motion of the assembly about the output axis is characterized by an undamped natural frequency. In the past, this natural frequency has been relatively low and has frequently caused system dynamics problems in various usages. A fairly low undamped natural frequency usually adversely influences the control loop servodynamics of a particular system. Also, a structure having such a low frequency is typically sensitive to vibrational and unidirectional acceleration effects upon mass unbalance and bearing friction. Consequently, viscous damping is added for high performance rate gyros, by sealing the gimbal assembly so that it may be floated in a fluid. Viscous shear action in the fluid between the gimbal assembly surface and the internal surface of the outer case produces the viscous damping effect. The flotation effect is often used also to relieve the gimbal axis bearings of the bearing load of the assembly. However, the use of this additional design feature leads to secondary, but very important design problems, such as sealing, temperature coefficient of the fluid, control of temperature of the fluid, etc.

Where a potentiometer is used as the gyro transducer, various problems have appeared in the past. The potentiometer wiper contacts cause a frictional torque load about the output axis and hence introduce various errors. Also, good conduction contact must be assured by the design at all times, even under extreme vibration conditions so that no jumping, arcing or serious oxide formation occurs. There must also be adequate resolution and linearity. Material wear must not permit deterioration of the above features.

The synchro or differential transformer consists of a movable element with a coil winding upon a magnetic core material. This rotor moves in the electromagnetic field set up by a stationary set of windings which is powered by an external power source. The power gain of a synchro is not as great as for the potentiometer. Also, a synchro is usable generally only for a limited design range of power source. Some torque due to induced electromotive forces may occur. The synchro signal is usually sensitive to axial play effects, such as encountered under unidirectional acceleration.

Both the potentiometer and the synchro require discrete angular or linear displacement. The electrical null must be very closely matched with the mechanical null of the return spring.

Resolution, linearity, null noise, sensitivity and transducer matching with suitable detection circuits are inherent design problems of all transducers.

I have invented a gyro which simplifies, minimizes, or eliminates all of the foregoing problems. In doing so, I have made use of a certain magnetic phenomenon. The primary factors determining magnetic changes in a ferromagnetic material are field strength, stress, and temperature. If temperature is held constant, then the induction will vary with field strength for various stresses. A different set of characteristics is obtained under the condition that field strength value is held constant while stress is changed. By use of this phenomenon, a transducer is provided which derives an induced electrical signal output which is proportional to stress. The signal obtained is several thousand times more powerful than that obtained from strain gages, and the "zero" signal is free from drift. The maximum range of stresses either experienced or to be measured must be well below the value defined by the elastic limit of the material. As long as this condition is fulfilled, then the magnetic, mechanical and thermal characteristics are predictable and repeatable. Constant temperature is usually not necessary if the material is appropriately chosen, so as to have a Curie point higher than the maximum anticipated ambient temperature. In any case, the design applications are permitted much greater freedom than with present practice. Among the materials usable for making use of this phenomenon are a 38–62 iron-nickel alloy and 12–88 iron-nickel alloy.

In making use of this phenomenon, I have provided a gyroscope wherein the gimbal or gimbals are supported by a transducer which makes use of this principle. Thus the transducer not only supports the gimbal but also serves to provide the electrical output signal from the gyro.

Accordingly, it is an object of this invention to provide a gyro which eliminates bearings from the output axis, thereby eliminating all critical bearing dirt problems.

It is an object of this invention to provide a gyro which eliminates cross-coupling.

It is also an object of this invention to provide a gyro which has a rather high natural frequency, a frequency somewhat higher than that which may be expected in a typical application.

It is also an object of this invention to provide a precision gyroscope which avoids the problems produced by viscous damping, such as sealing of a fluid and the control of the fluid temperature.

Yet another object is the elimination of gyro problems presently encountered with transducers such as potentiometers which includes wiper torque and electrical contact problems.

A still further object is the elimination of gyro problems produced by gyro transducers such as synchros which include low power output, a limited power source, electromotive force torque, and axial play effects.

A still further object is the elimination of the need for coordinating by mechanical means or adjustment the electrical null of the transducer and the mechanical null of a typical rate gyro.

Another object is the provision of a gyroscopic angular accelerometer.

Other objects, features and advantages of the instant invention will be apparent from the following detailed description of the attached sheets of drawings, which by way of several embodiments illustrates the invention.

Figure 1:
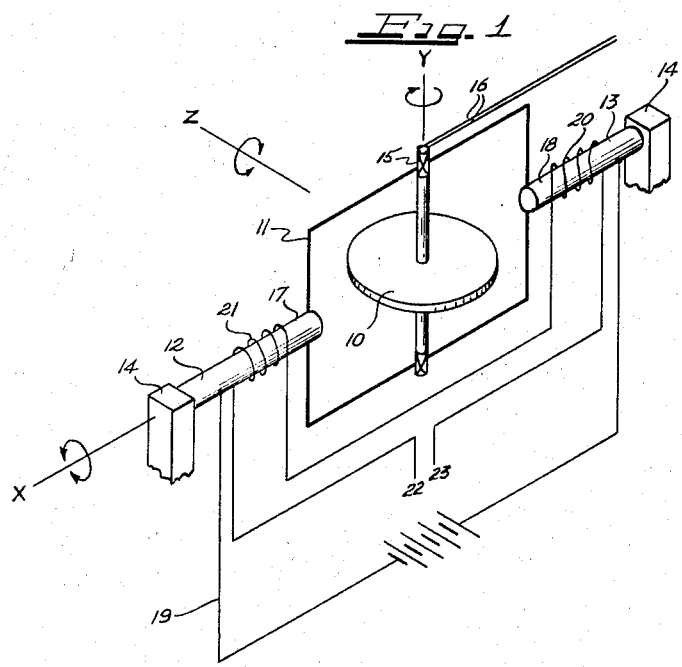
Figure 1 is a diagrammatic view of a restrained gyro in accordance with my invention.

Referring to Figure 1, it can be seen that this gyro comprises a combination of a conventional rotor 10 with a gimbal 11, transducers 12 and 13, and a support 14.

The rotor 10 may be any conventional rotor, either air-driven or, as here illustrated, electrically driven. The rotor itself may have any desirable configuration. The rotor bearings 15 mount the rotor 10 in a gimbal 11 for rotation. The rotor 10 is shown as rotating about a spin axis, here designated as being the Y axis. While this first axis has been shown as being vertical, it will be apparent from that which follows that, if desired, the spin axis could lie in any desired attitude. Where an electrical rotor is used, lead wires 16 to the rotor may be dressed along and tied to the gimbal 11 in a conventional manner. The support 14 illustrated in Figure 1 in partial view, is extended (not shown) in an convenient way to form a rigid mounting base which may also include provisions for a cover, electrical connections, and other usual features. When the gyroscope unit is installed in a vehicle or other device, the support 14 is conventionally rigidly secured to such vehicle so that the motions to be sensed are transmitted by the support 14 to the internal structure. Of course, shock mounts having an appropriate natural frequency may also be utilized, if desired, for support 14.

The gimbal 11 is secured to at least one transducer, but preferably two transducers 12 and 13, which is secured to the support 14. Since the junction between the support 14 and the transducer 13 is rigid, and since the junctions between gimbal 11 and each of the transducers 12 and 13 are rigid, the transducer magnetic elements 17 and 18, presently to be described, may be made integral with the gimbal, with the support, or with both the gimbal and the support. Thus a low cost simple structure may be provided wherein substantially all of the major stationary components are formed of one piece of material. Where the elements 17 and 18 are not made of the same piece of material as is the support 14, it is preferable to provide electrical insulation (not shown) between each transducer and the support. Also, the insulation may be provided within the support 14 in any manner provided that the support 14 does not form an electrically conductive path from transducer 12 to transducer 13.

Each of the transducers 12 and 13 has respective elements 17 and 18. These elements are torsionally sensitive, have a slight amount of torsional resilience, are electrically conductive, ferromagnetic, and have high strain sensitivity. The gimbal of the Figure 1 structure is also electrically conductive so that means 19 may be utilized to pass an electrical exciting current through element 17, gimbal 11, and element 18. Depending upon the result desired, the exciting current may be either direct current or alternating current. It will be seen presently that when direct current is utilized, the gyroscope will be an angular acceleration gyro device, while if alternating current be utilized, the gyroscope will be a rate gyro, or angular velocity sensing device. Where the exciting current is A. C., its frequency must be high with respect to the highest frequency to be sensed. Windings 20 and 21 are placed adjacent to magnetic elements 18 and 17, respectively, and are here shown as being connected together in series so that their respective outputs are vectorially combined, preferably aiding each other. Leads 22 and 23 of the unit are connected to the device, system, or indicator with which this gyroscope is used. If desired, the transducer element may be made hollow as shown in element 18 (of Fig. 4) at 24 for the reception of various lead wires such as, but not limited to, 16. Of course a similar opening must be provided in the support 14.

To understand the operation of this gyroscope, a brief discussion is first given of the operation of the transducer pickup. The transducer elements 17 and 18 are made of ferromagnetic material, in which a magnetic field is established. A torque load upon the material causes a change in the vector direction of magnetization. Stated otherwise, if current is passing linearly along the length of element 17, it is well known that a magnetic field will surround that conductor and that this magnetic field may be represented by circular lines surrounding the element 17. These circular lines denote planes which have an angle with respect to the axis of element 17. When a torque load is applied to element 17, the angle between these planes of lines of magnetization and the axis of element 17 changes. Thus, there is a changing magnetic field which moves relatively to the winding 21 and induces a current therein. Thus, an output signal is derived by induction with the turns of winding 21, as the flux linkage changes with change in vector direction of magnetization. The output voltage at leads 22 and 23 is sensitive to changes in direction of input torque. As the torque is increased indefinitely, the output voltage asymptotically approaches a limit. Thus the signal output is greatest per increment of torque near the neutral position and it is desirable to have a given transducer so designed that this portion of the output curve is used. Thus it may be desirable to suppress the output of the transducer for the highest levels of torque. Thus an output voltage is obtained which is proportional to input torque.

If direct current is utilized in the means 19, the output voltage is proportional only to the rate of input torque. Thus, when D. C. is used, the transducer may be used as an angular accelerometer.

In actual practice, the transducer may be subjected to various environmental and loading conditions which could be possible sources of "noise" (or spurious output signal) or affect the functional relation between output and desired input. The primary possible sources of "noise" are (a) bending load, unidirectional or oscillatory, (b) axial load, unidirectional or oscillatory, and (c) external magnetic fields. The transducer gives no output in response to bending or axial loads, unidirectional or vibratory. Skewness of the coil assembly or winding 21 upon the ferromagnetic shaft or element 17 does not distort the transducer characteristic or cause "noise." External magnetic fields can affect this transducer only if there is a flux linkage with the inductive coil, if the additional flux density is significant compared to the flux density due to the excitation current, and if the external field harmonics are approximately equal to or greater than the frequency of the exciting current. Even then, this possible magnetic effect can be eliminated by appropriate selection of the polarizing field strength level; this effect is most pronounced if the transducer is operated with very low polarizing field strength or near saturation. Consequently, the magnetic transducer is also unaffected by all spurious external fields which are encountered in practice.

The primary possible factors affecting functional relation between input and desired output are (1) bending load, unidirectional or vibratory, (2) axial load, unidirectional or vibratory, (3) external magnetic fields, (4) frequency or current change in excitation current, and (5) temperature change. Bending and axial loads, and external fields are negligible in effect with proper design as indicated above. Frequency and current changes which are permissible and expected in practice have a secondary effect upon the transducer characteristic. The transducer may be affected most by temperature change, as has been implied above. However, this effect can be made negligible either by appropriate selection of material and field strength, or by temperature compensation. That is, it is possible to select material with an appropriate polarizing field strength so that the induction characteristics will remain quite constant over a very broad range of temperature, until fairly close to the Curie point. (The Curie point is that temperature of metallurgical phase change, at which the material changes from ferromagnetic to paramagnetic properties. This temperature can be from about 180° C. for iron-nickel alloys, or higher.) If temperature-compensation is used, the requirements for such compensation are much less severe than for present rate gyro designs; that is, an almost crude compensation is adequate. As a corollary, the upper operating limit of the gyro is determined by the Curie point of the material producing the magnetic field.

Magnetization of a ferromagnetic material causes a change of the elastic modulus. However, further consideration of this fact is not necessary since this transducer does not operate anywhere near resonance. Consequently, the shift in resonant frequency will not have any significant phase or gain effect in the frequency region of operation, especially since damping (other than intrinsically present in the material structure) is not used. That is, it is only necessary to make certain that the resonant frequency is well outside the frequency region of dynamics application, so that torque feedback cannot occur.

The hysteresis loop for induction change with stress at constant polarizing field strength should be minimized for dynamic application of stress. This phenomena can be adequately reduced by suitable selection of material and operation with maximum stress well below that stress producing saturation induction. This hysteresis will be minimized by the use of materials of low anisotropy constant, with suitable strain-relief or annealing.

Thus, by use of the transducers not only as a signal-producing means in the gyroscope, but as a means for supporting the gimbal or gimbals, the use of bearings in the output axis has been avoided.

Assuming that the rotor is revolving about the Y axis in the direction indicated by the arrow about the Y axis, it is apparent that if the support 14 were revolved or rotated about the Z axis in either direction, there would be a torque appearing at the inner ends of elements 17 and 18 which would be opposed at the outer ends of these elements by the support 14. While the transducers are receiving torsional stress to produce an output signal, they are carrying the weight of the gyro rotor and the gimbal. Since the transducers are not responsive to bending loads, a true angular rate-sensing is thus performed.

In the drawing of Figure 1, the excitation current is shown as being carried through the gimbal. If it is considered objectionable to have the current passing through the gimbal, and thereby possibly through rotor bearings, the transducers 12 and 13 may be insulated from gimbal 11 by any convenient rigid means, and a jumper wire provided to join the inner ends of the transducers 12 and 13.

Another way of avoiding having current passing through the rotor and gimbal assembly is to provide hollow elements 17 and 18. Means 19 are then directed in the form of an insulated wire through each of the hollow elements. It can be seen that current flowing through this wire will have a magnetic field about it which will cause the ferro-magnetic elements 12 and 13 to have the required magnetic fields.

Figure 2:
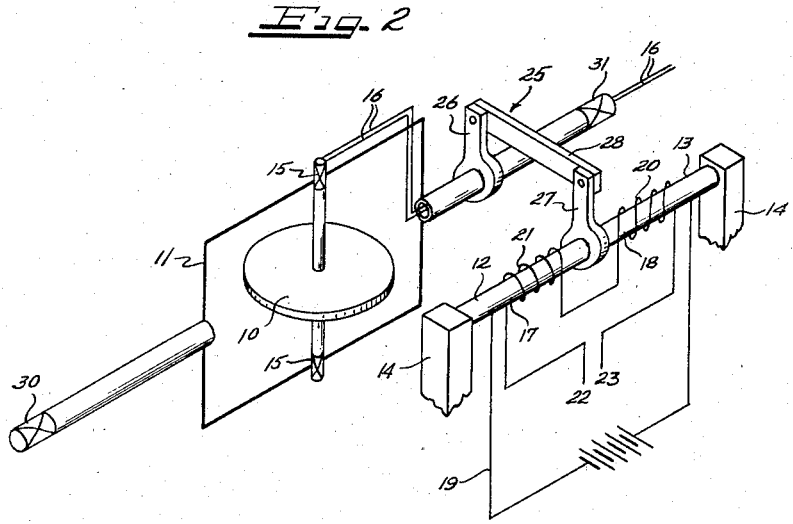
Figure 2 illustrates a gyro which is a modification of the Figure 1 structure and wherein a current path has been isolated from the rotor bearings.

Still another structure for keeping the excitation current out of the gyro rotor and gimbal is illustrated in Figure 2. In this view, similar parts have been given similar numbers. Thus a rotor 10 is supported by bearings 15 within gimbal 11. The gimbal 11 is supported by bearings 30 and 31 which are carried rigidly by other portions of support 14, not shown. The rigid support 14, illustrated by a pair of rigid risers, supports the outer ends of transducers 12 and 13 carrying windings 21 and 20, respectively. The elements 17 and 18 are secured at their outer ends to the support base 14 which is provided with insulation as before so as to avoid having a parallel circuit through the base for the excitation current. Similar means 19 provides excitation current through the elements 17 and 18 which may, as before, if desired, be made hollow so as to allow an insulated wire to pass through its center, said wire carrying the exciting current. Windings 21 and 20 are connected as before in aiding series and terminate in lead wires 22 and 23 which may be directed to the system into which the gyro device is to serve.

Thus it can be seen that the exciting current passes through means 19, and through the elements 17 and 18, and not in any way through any part of the rotor or gimbal. The gimbal 11 is connected by an insulating linkage, generally indicated at 25, to the transducers. The linkage 25 serves to transmit torque from the output axis of the gimbal to the inner ends of transducers 12 and 13. In the form illustrated, the linkage 25 comprises a crank 26 connected to the gimbal, a crank 27 connected to the transducer elements, and bar 28. Any one of these elements may be an insulating member. Of course in an actual structure, the bearings 30 and 31 would likely be carried in recesses within gimbal 11, while crank 26 would be a part of the gimbal itself. The Figure 2 transducer structure may be excited by either A. C. or D. C. and various lead wires may be routed as described in connection with Figures 1 and 4. The operation of the Figure 2 structure is identical to that of Figure 1 with the addition that the torque output of the gimbal is insulatedly transmitted to independent pickups or transducers. Of course, it is within the contemplation of this invention that bearings 30 and 31, in place of being a free-turning type of bearing, may, as shown in Figure 1, be torsionally resilient elements.

For gyros to be constructed in accordance with this invention, it is necessary that the magnetic field be adjacent to the windings 20 and 21 of the transducers.

Figure 3:
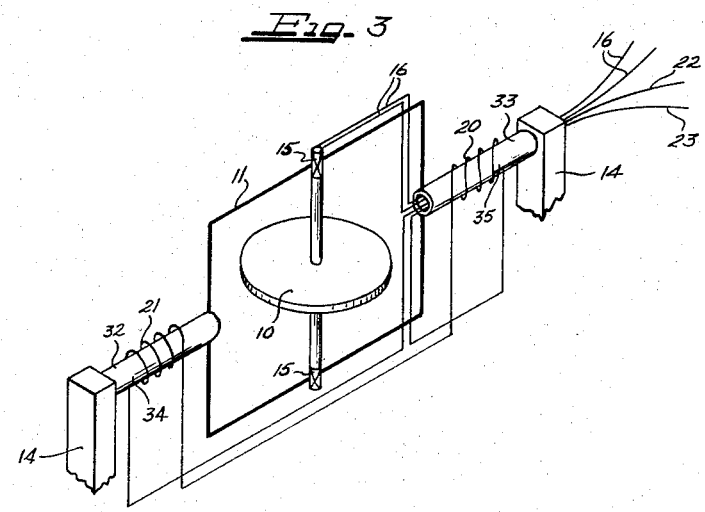
Figure 3 illustrates a second modification of the structure shown in Figure 1.

Still another way of producing this field is illustrated in Figure 3. Figure 3 shows a rotor 10 supported in gimbal 11 such as by bearings 15, and having lead wires 16 dressed along gimbal 11 and out through a hollow pickup. This gyro has transducers 32 and 33 which are similar to transducers 12 and 13 except that no exciting current is provided to produce a magnetic field. Instead, elements 34 and 35 comprise permanently magnetic material, either integral or inserted, which has been magnetized in any convenient way so as to create a magnetic field adjacent to windings 21 and 20, respectively. Transducers 32 and 33 are supported by the base 14 as before, there being no need to eliminate an electrical path through the base 14 as by insulation. This view also illustrates that the windings 21 and 20 may be connected together in vector series as before but with their output lead wires 22 and 23 directed through one of the hollow elements 35.

It can be seen that with a standing magnetic field surrounding the windings 21 and 22, an application of an input rotation to the gyro results in a torque by the gimbal 11 applied at the inner ends of transducers 32 and 33 which, in turn, produce an angular acceleration signal appearing at lead wires 22 and 23.

As thus shown in Figures 1 to 3, the various forms of this gyro convert the gyroscopic moment into an electrical output signal directly without an extremely precise-dimensioned mechanical system. Extremely minute angular deflection of the transducer element between the fixed clamping points and the point of torque application dispenses with the need for protective damping. At the same time, the natural frequency of the system is very high, being in excess of 100 C. P. S. for the most adverse design conditions, so that viscous damping is not necessary. Consequently, the rigorous temperature control of the viscosity of a fluid is eliminated; any desired temperature control can be quite primitive without stringent performance characteristics. Perpendicularity between the input axis and the gyro spin axis is always maintained by the gyro of this invention, so that significant cross-coupling error is avoided. By the device disclosed herein, the critical adjustment wherein the electrical null and the mechanical null are correlated is avoided. In the disclosed gyro, this correlation is inherently provided, since signal null is identified by zero deflection, neglecting possible hysteresis loop width. The sensing performance of this gyro is not affected by extreme conditions of acceleration, vibration and shock. Since the entire structure can be made rigid, slop or backlash is eliminated as a source of performance error. At the same time, compliance effects do not introduce spurious signals into the output, since the transducer output is independent of bending or axial motion or load. Plainly, therefore, the cost and complexity of the rate gyro or accelerometer can be drastically reduced from the present practice by use of the principles of the instant invention. The gyro disclosed herein permits a drastic reduction in the number of component parts, a reduction in the amount of close machining necessary and liberalizing of manufacturing tolerances. Further, assembly time, process time and close adjustments are also reduced substantially.

Simultaneously, performance has been tremendously improved. Cross-coupling error has been eliminated; a rigid unitized assembly has been provided, such assembly having a very high natural frequency which needs no viscous damping; and the gyro is free from noise due to bending or axial leads from either unidirectional acceleration, vibration or shock. Furthermore, compliance of the complete gyro structure is minimized, thereby obtaining more predictable invariant performance.

When the transducer is excited by a direct current or utilizes a permanent magnet as a field source, the output is proportional to the input angular acceleration whereby the unit becomes an angular accelerometer. It will be appreciated that where this device is used as an accelerometer, the acceleration signal may be externally integrated. When the transducer is excited by alternating current, the output is proportional to the input angular velocity, thereby producing a rate gyro. The gyro can be used for precise and immediate conversion of a rate command to a proportional output if desired. Further, the output impedance of the gyro is quite low so that many possible circuit designs are available for the use of the intelligence data or signal. Still further, the transducers may be insulated from each other, one being used as a rate sensor, and the other as an acceleration sensor, by use of A. C. and D. C. excitation currents respectively.

Figure 4:
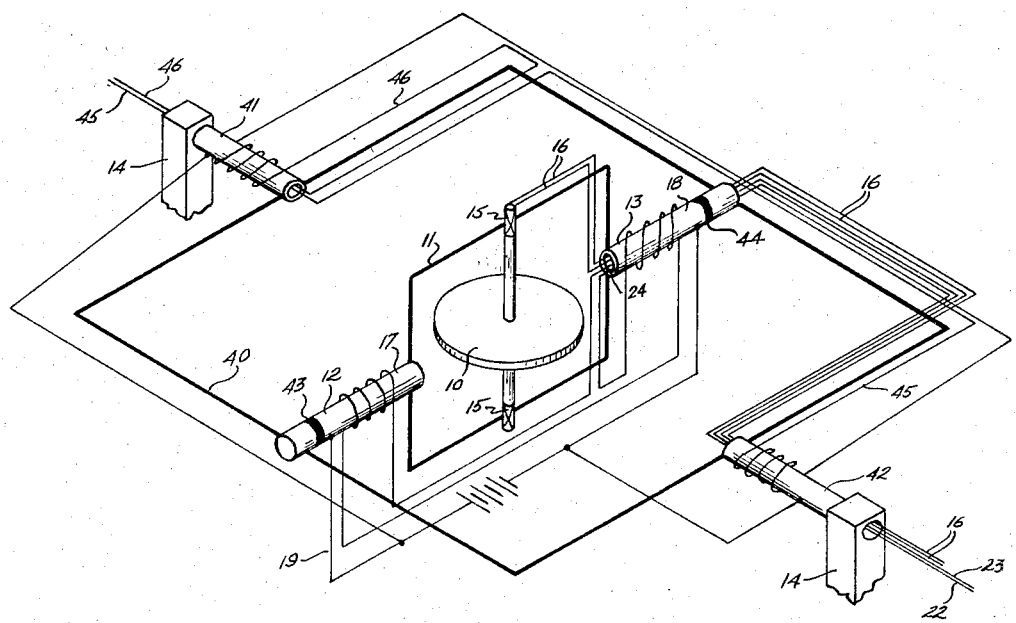
Figure 4 illustrates the gyro of Figure 1 but with pickups or transducers provided in both horizontal planes.
Figure 5:
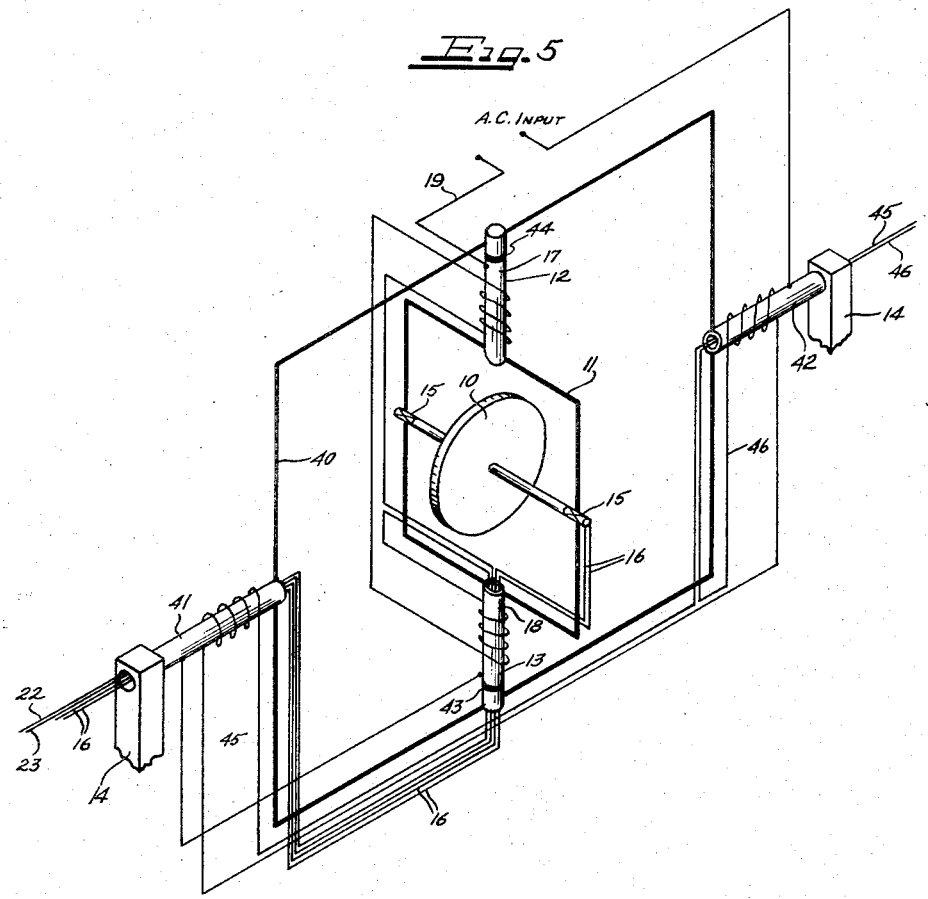
Figure 5 is a diagrammatic view of a gyro similar to that of Figure 4, but with a pick-up in each of one horizontal and the vertical axes.

Still further, the gyro may be constructed as a restrained gyro having more than a single degree of freedom, since the non-existence of significant angular displacement about the output axis of an inner degree of freedom does not cause undesirable errors in input moments for successive output axes. This is most clearly seen by referring to Figures 4 and 5. Figure 4 shows a rotor 10 rotating about a vertical axis, while the rotor 10 of Figure 5 has been positioned to rotate about a horizontal axis. Assuming this device were used in an aircraft, the Figure 4 structure may be utilized to detect the rate of roll and the rate of pitch when used as a rate gyro, and/or the acceleration of roll and the acceleration of pitch when used as an accelerometer. The device of Figure 5 may be utilized to detect the respective rates and/or accelerations of yaw and either roll or pitch. The gyros diagrammatically shown in each of Figures 4 and 5 have their rotors 10 supported by bearings 15 in a gimbal 11 to which are attached transducers 12 and 13, for both support and signal generation. As before, these transducers have elements 17 and 18 through which passes an exciting current from appropriate means 19. The current may be either D. C., as shown in Figure 4, or A. C. as shown in Figure 5, depending on the desired output signal. It will be seen that this much of the structure of each of Figures 4 and 5, including the supports 14, is substantially identical to that of Figure 1. The outer ends of the transducers 12 and 13 of Figures 4 and 5 are carried by a support 40 which in this instance is a second or outer gimbal. The outer gimbal 40 is secured to transducers 41 and 42 which are similar to transducers 12 and 13. Transducers 41 and 42 are carried by the support 14 which is insulated and is similar to that shown in Figure 1. In order to provide suitable paths for the exciting current to flow in, the transducers 12 and 13 have been insulated as at 43 and 44 to insulate transducers 12 and 13 electrically from gimbal 40. Figure 5 shows that each of the transducers may be connected in series with each other so that the exciting current passes through all of them. Referring to Figure 4, a series-parallel arrangement is illustrated. In each of Figures 4 and 5, the output leads 22 and 23 for the one axis are usually separate and distinct from the output leads 45 and 46 of the other output axis.

Referring to Figure 4, the horizontal axis comprised of elements 12 and 13 may serve as an input axis with rate or acceleration signals being produced by elements 41 and 42 and sensed at terminals 45 and 46. Likewise the horizontal axis comprised of elements 41 and 42 may act as an input axis with rate or acceleration output signals being produced by elements 12 and 13 and sensed at terminals 22 and 23. Similarly in Figure 5, the vertical axis may serve as an input axis with output from the horizontal axis being sensed at terminals 45 and 46, and the horizontal axis may serve as an input axis with output from the vertical axis being sensed at terminals 22 and 23. When one axis perpendicular to the rotor spin axis serves as an input axis, the output is sensed by the transducers in the other axis which is also perpendicular to the rotor spin axis. Of course, whenever input rotation occurs about each input axis simultaneously, each of the output signals may be obtained at the same instant. Each output torque will be proportionate to the input rate or acceleration about the respective input axis.

It will be understood that numerous modifications and variations may be effected without departing from the scope of the novel concepts of the present invention.

I claim as my invention:

A gyro comprising in combination: a rotor; an electrically-conductive gimbal supporting said rotor for rotation about a first axis; a support; a pair of transducers, said transducers each comprising a torsionally-sensitive electrically-conductive element having ends, and an electrical output winding surrounding said elements; and means for passing an excitation current directly through said elements and said gimbal in series for creating a magnetic field about each winding; said electrical winding of each element being connected in aiding series with each other; one end of each of said elements being fixedly secured to said support, the other end of each of said elements being fixedly and electrically connected to said gimbal whereby rotation of said rotor about a second axis produces a torque about a third axis which torque is applied to said other ends of said elements.

References Cited in the file of this patent

UNITED STATES PATENTS 2,511,178    Rotters _____ June 13, 1950